United States Patent [19]
Rubio et al.

[11] 3,785,201
[45] Jan. 15, 1974

[54] DETERMINING HARDNESS OF SOFT MATERIALS
[75] Inventors: Manuel Jesus Rubio, Bridgeport, Conn.; Victor Mario Leal, Monterrey, Mexico
[73] Assignee: Roberto Gonzalez Barrera, Monterrey, Mexico
[22] Filed: Nov. 3, 1971
[21] Appl. No.: 195,315

[52] U.S. Cl. .................................. 73/169, 73/81
[51] Int. Cl. ............................................ G01n 33/10
[58] Field of Search ................ 73/169, 432 R, 78, 73/81, 85, 101, 104, 150

[56] References Cited
UNITED STATES PATENTS
3,181,352  5/1965  Nakamura et al. .................. 73/101
2,481,467  9/1949  Bloom et al. ........................... 73/78
FOREIGN PATENTS OR APPLICATIONS
970,209  9/1964  Great Britain ........................ 73/78

Primary Examiner—Richard C. Queisser
Assistant Examiner—Joseph W. Roskos
Attorney—Joseph Gray Jackson et al.

[57] ABSTRACT

In determining hardness of soft materials a cutting edge which is preferably blunt and preferably a wire, is pushed or pulled into the test specimen in a direction transversely to the cutting edge under a force, and the relation of the force, the length of cut and the time is determined. The force is preferably applied progressively diminishing from a maximum at the time of application to a minimum at the end of test. Either the length of cut or the time is preferably a variable. The force application is preferably tangential to the arc of a circle.

The area of the cutting edge exposed to the sample is preferably constant or substantially constant. In the preferred embodiment three faces of the sample are exposed to the cut.

12 Claims, 2 Drawing Figures

DETERMINING HARDNESS OF SOFT MATERIALS

DISCLOSURE OF INVENTION

The invention relates to measuring hardness or softness of soft materials such as corn dough for tortillas which are made from corn which is nixtamilized or cooked in lime-water, and other soft plastic materials including other doughs, ceramics and refractory mixes, materials for building construction such as unhardened, underhardened or partially hardened concrete and a wide variety of food materials which are soft, or relatively soft, such as ripe, partially ripe or unripe fruits and melons and a wide variety of ripe, partially ripe or unripe vegetables and the like.

In the drawings we have chosen to illustrate one only of the numerous embodiments in which our invention appears, choosing the form shown from the standpoints of convenience in illustration, satisfactory operation and clear demonstration of the principles involved.

The terms "hardness" and "softness" are used herein to mean opposite concepts in testing soft materials in the sense that a material having minimum hardness has maximum softness. On the other hand the term "soft" is used to mean relatively soft such as doughs, batters and the like before cooking.

In Mexico along tortillas are a staple articles of food and at least 20,000 small factories produce tortillas without any practical way to control the softness of the corn dough. It is very difficult even for a person having experience to measure the softness of tortilla dough and to produce it consistently to desired softness. When it is understood that many factories produce tortilla dough 24 hours a day in Mexico and other countries, and employ different personnel on different shifts, it is seen that it is very difficult indeed to measure the softness and produce tortilla dough which is consistent merely by hand feeling it. It also must be understood that most producers of tortilla dough are practical persons without scientific training.

There are various devices on the market which determine hardness (or softness) in soft materials, some using impact and some using a predetermined force which is constant during the test. In the prior art it is common to vary the area of force application as the material distorts under test.

One difficulty with these prior art devices is that they are prohibitively expensive when thinking in terms of a small factory which doe not have much money to spend for test equipment. For example, the Precision Scientific Penetrometer costs in United States dollars $400.00.

One advantage of the present invention is that the device of the invention can be produced and sold very cheaply. As compared with the above cost figures, the device of the invention can be sold for about United States dollars $40.00.

Another advantage in the invention is that it is relatively simple in design and operation and has few parts which can get out of order. Prior art devices in some cases involved relatively complex mechanisms such as racks and gears, which necessarily add to the cost of production.

The device of the invention is very reliable and gives results which are repetitive with a good degree of control.

The device of the invention can also be used relatively rapidly and it is convenient.

The device of the invention withstands rough handling and can be used by relatively unskilled persons without scientific training as a control device, as well as by scientifically trained personnel for scientific purposes.

The drawings are exemplary of one embodiment of the invention.

Figure 1:
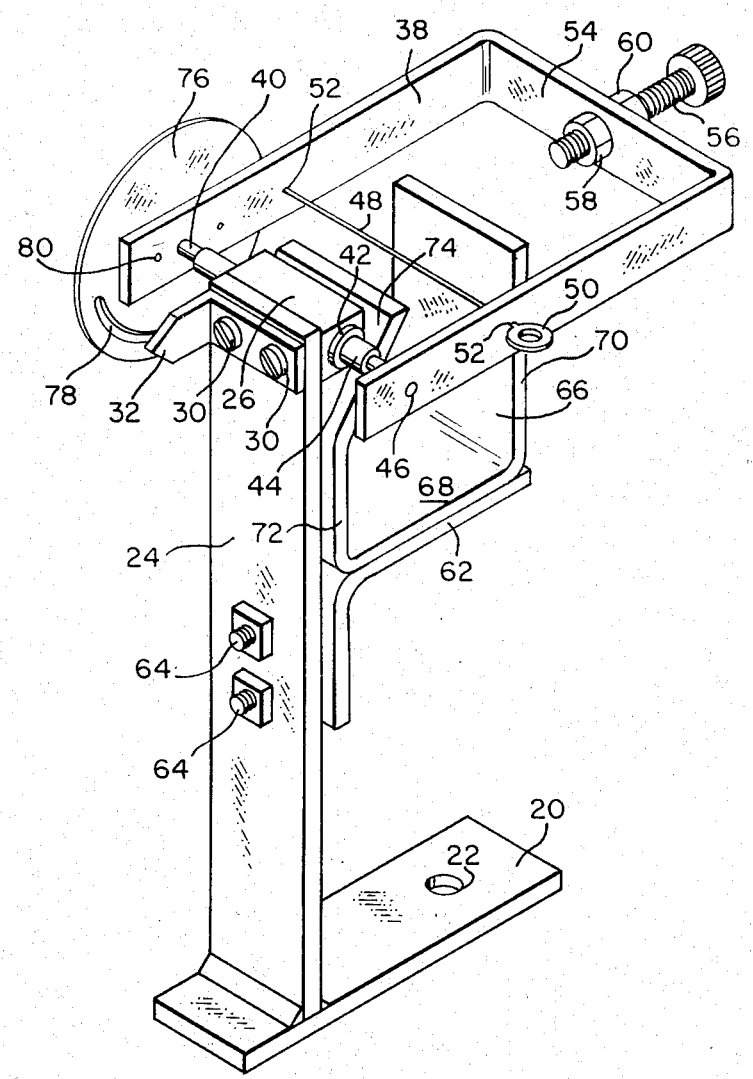
FIG. 1 is a perspective of the device of the invention fully assembled.
Figure 2:
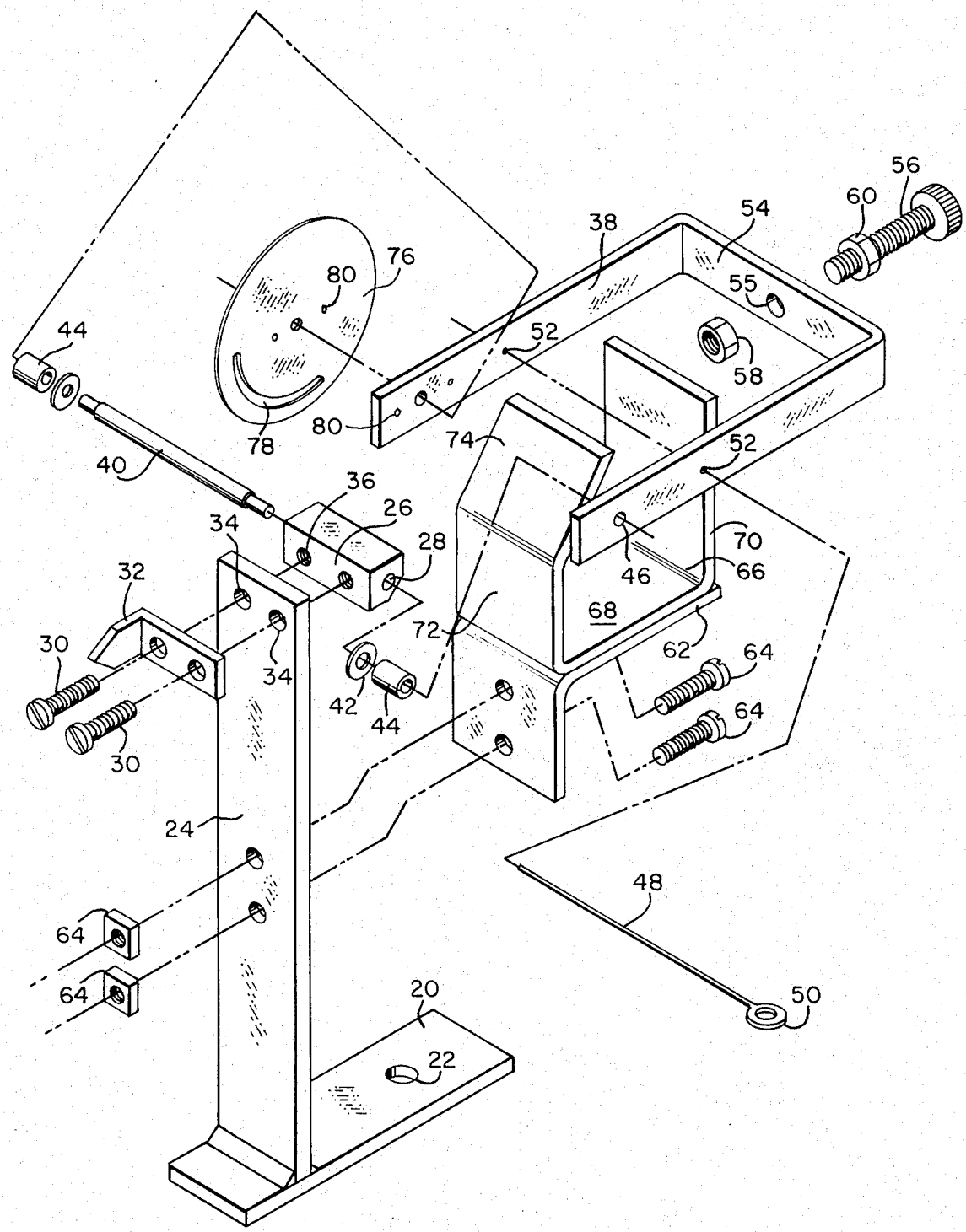
FIG. 2 is an exploded perspective of the device of of FIG. 1.

In experimental work with the device of the invention on tortilla dough, cooked corn and cooked corn flour, the device of the invention has been found to be rugged, and free from trouble.

In accordance with the invention a cutting edge, preferably a blunt cutting edge such as a wire or small rod, is brought in contact with the surface and moved transversely to cut the surface. By this is meant that the wire or rod when brought in contact with the surface extends along the surface and moves transversely into the test material at right angles to its length. It will be understood that when reference is made to moving transversely it is meant that the wire moves substantially transversely, it being recognized that the wire moves in an arc.

In contrast to some production cutting device for cutting soap and the like which are not intended for testing, the wire or rod which is used as a blunt cutting device does not need to be under tension and preferably is not under tension, so that of course in its travel into the material to make the cut, it bends slightly or substantially.

Unlike prior art penetrators which force a diamond cone or a steel cone penetrator into the material, in the invention the surface of contact between the knife (wire) and the test material, once full contact is established, is constant during the test and further penetration does not increase the area of contact.

Unlike many devices in the prior art which subject the specimen to a constant force, in the present invention the specimen is subjected to a force which continously diminishes during the period of test. This is accomplished by a rotating arm which applies a force tangential to a circle having its center at its axis of rotation. Under these conditions, force diminishes as the arm rotates, making the wire penetrate into the sample. The tangential force is maximum when the arm is horizontal, and becomes zero when the arm is in vertical position.

In the present invention the specimen is preferably placed in a mold and cut prior to test so that the specimen is of parallelepiped or prismatic shape with three exposed active faces of the specimen which are cut.

The machine has a horizontal base 20 which may be mounted by a bolt passing through a hole 22 and the base supports an upright 24 having at the top a pivot block 26 suitably having a horizontal pivot opening 28 and secured by machine screws 30 passing through openings in a pointer 32, through openings in the upright 34 and lodged in threaded openings 36 in the pivot block.

An arm 38 is initially pivoted by a pivot pin 40 extending through the pivot block and having at the ends washers 42 and spacers 44. The ends of the pin have reduced diameter sections which are lodged in openings 46 in opposite sides of the arm.

At a suitable distance from the center of the pivot pin 40, suitably six centimeters in the preferred embodiment, there is a wire 48 extending across between opposite sides of the arm and having a ring 50 for removing it. The wire extends through openings 52 in the arm and is supported in horizontal position. It will be seen that in this embodiment the wire is not under tension. The total length of the arm from the center of pivot pin 40 in this embodiment is 13.3 centimeters, though of course it can be shorter or longer as desired. The arm has a cross piece 54 parallel to the pivot pin and at the center through an opening 55 passes bolt 56 locked at any adjustable position by nuts 58 and 60.

It will be understood that a suitable weight not shown of any desired size is connected to the bolt 56, the preferred size of the weight in this embodiment being preferably 0.250 kilograms. On the upright 24 shelf 62 is supported by bolts 64. Resting on the shelf is mold 66 having an open top and an open front and back, having bottom 68, one upstanding side 70, another upstanding side 72 having an offset 74 to allow for the pivot of the arm. On the arm there is provided scale 76 having an arcuate slot 78 to see the pointer on the upright, secured by screws through openings 80 and suitably calibrated in angles. The mold suitably has a size of five centimeters front and back but eight centimeters wide and the mold uprights are suitably eight centimeters long.

It is immaterial in a broad sense whether the pointer is fixed and the dial moves with the arm, or vice versa.

It will be evident that the mold is preferably filled and the excess of sample cut off on the sides and top when the mold is outside the machine, after which the mold is inserted in position on the shelf.

It will be evident also that the arm must be held up as soon as the sample is inserted until the test is ready to start.

It will be evident that the sample under test is shaped as a parallelepiped having three edges exposed.

It will be evident that since the mold and the arm are moving relatively, either one of them can be stationary and the other can move.

In using the device, after filling the mold with the sample and cutting off the excess sample as described, the mold and sample are placed on the shelf being sure that the machine is set up so that the shelf is horizontal. The arm is brought down until the penetrator wire just touches the top of the specimen without impact, having a weight attached to the arm which will apply the force. Then the hand of the operator releases the arm and allows the penetrator wire, which initially has made a slight mark on the sample, to penetrate the sample under the force. The penetrator wire follows a circular path through the sample, cutting it on the top and both sides in the preferred embodiment. When the arm is released, the operator observes a watch or clock, so that the time of penetration will be known.

There are two ways in which the device can be readily used:

1. The penetration can be permitted to take place for a predetermined time. It has been found desirable to allow penetration of tortilla dough for thirty seconds. If the material is somewhat harder than tortilla dough, a longer period of test can be used, and if the material is softer, a shorter period can be prescribed. At the end of the test the operator reads on the dial and records the penetration as a function of the angle described by the arm.

2. Under an alternate method of test, the penetration is allowed to go on until a prescribed length of cut (or angle) has been made and the time is read as variable.

Both of these methods of test in the usual case give useful readings, although of course the operator may find on a specific material that one method of test is preferable to the other.

After completion of the test, the wire is removed from the arm and the mold is removed for cleaning before further testings.

It will be evident that since the force applied by the arm and the wire is always tangential to a circle, on well known trigometric and physical principles the force exerted by the weight is a maximum when the arm is horizontal and diminishes as the arm descends toward the vertical.

EXAMPLE

In testing tortilla dough for a period of thirty seconds a weight of 0.250 kilograms was applied initially to the wire on a lever arm of 6.0 centimeters. The penetration at the end of the test was 50 degrees.

It will be evident that the device of the invention can be used in the control laboratory either to test the tortilla dough from the standpoint of variations in cooking procedure of the corn, or to test the properties of tortilla dough made from different kinds, ages or locations of growth of the raw material.

The invention is also applicable to scientific or analytical procedures particularly by a large tortilla industry buying corn in vast quantities from a wide variety of sources, so that the raw materials can be selected most advantageously.

The invention is also applicable to other materials such as bread mixes, cake mixes, ceramic mixes, plasters and concretes, when soft, to test the difference in properties.

In view of our invention and disclosure, variations and modifications to meet individual whim or particular need will doubtless become evident to others skilled in the art to obtain all or part of the benefits of our invention without copying the device and process shown, and we, therefore, claim all such insofar as they fall within the reasonable spirit and scope of our claims.

Having thus described our invention what we claim as new and desire to secure by Letters Patent is:

1. A process of determining the hardness of a sample of soft material, which comprises forcing a blunt cutting edge transversely to that edge through the material, the force progressively diminishing as the depth of cut increases, and determining the relation among force, depth of cut and time.

2. A process of claim 1, which comprises applying the force tangentially to a circular path.

3. A process of claim 2, which comprises maintaining a constant area of exposure of the cutting edge to the sample after initial contact between the cutting edge and the sample has been established.

4. A process of claim 3, which comprises exposing three faces of the sample to the cut.

5. A process of determining the hardness of a sample of soft material, which comprises forcing a cutting edge transversely to that edge through the material, progressively diminishing the force as the depth of cut increases, and determining the relation among force, depth of cut and time.

6. A process of claim 5, which comprises applying the force tangentially from a circular path.

7. A process of determining the hardness of the sample of soft material, which comprises forcing a cutting edge transversely to that edge through the material, applying a constantly diminishing force for a predetermined time, and measuring the depth of cut.

8. A machine for testing the hardness of soft materials, which comprises a specimen mount attached to hold a specimen of soft material exposed to test, and an elongated cutting edge disposed to impinge upon the surface of the specimen with the cutting edge in position to penetrate the specimen, force application means for relatively moving the specimen and the cutting edge in a direction transverse to the cutting edge to cut into the specimen, applying a force which progressively diminishes during the test, and means for measuring the depth of cut.

9. A machine of claim 8, in which the force application means includes a rotating arm applying force tangentially to a circle.

10. A machine of claim 9, in which the specimen has an essentially parallelepipic shape with at least three exposed surfaces.

11. A machine for testing the hardness of soft materials, which comprises a specimen mount attached to hold a specimen of soft material exposed to test, a cutting edge consisting of a non-tensioned wire disposed to impinge upon the surface of the specimen with the cutting edge in position to penetrate the specimen, force application means for relatively moving the specimen and the cutting edge in a direction transverse to the cutting edge to cut into the specimen, the force application means exerting a force which progressively diminishes during the test and means for measuring the depth of cut, the specimen having a parallelepipic shape.

12. A machine for testing the hardness of soft materials, which comprises a specimen mount attached to hold a specimen of parallelpipic shape and of soft material exposed to test, an elongated cutting edge of wire free from tension disposed to impinge upon a surface of the specimen with the cutting edge in position to penetrate the specimen, force application means for relatively moving the specimen and the cutting edge in a direction transverse to the cutting edge to cut the specimen, the force application means including a rotating arm applying force tangentially to the specimen, and means for measuring the depth of cut.

* * * * *